(12) United States Patent
Vitry (10) Patent No.: US 11,443,884 B2
(45) Date of Patent: Sep. 13, 2022

(54) MAGNETIC INDUCTOR, ELECTROMAGNETIC PUMP COMPRISING SUCH A MAGNETIC INDUCTOR AND METHOD FOR MANUFACTURING A MAGNETIC INDUCTOR

(71) Applicant: COMMISSARIAT À L'ÉNERGIE ATOMIQUE ET AUX ÉNERGIES ALTERNATIVES, Paris (FR)

(72) Inventor: Sylvain Vitry, Forcalquier (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 258 days.

(21) Appl. No.: 16/763,871

(22) PCT Filed: Nov. 19, 2018

(86) PCT No.: PCT/FR2018/052905
§ 371 (c)(1),
(2) Date: May 13, 2020

(87) PCT Pub. No.: WO2019/097193
PCT Pub. Date: May 23, 2019

(65) Prior Publication Data
US 2021/0175003 A1    Jun. 10, 2021

(30) Foreign Application Priority Data

Nov. 20, 2017 (FR) ...................................... 1760946

(51) Int. Cl.
*H01F 27/28* (2006.01)
*H01F 41/04* (2006.01)

(52) U.S. Cl.
CPC ............. *H01F 27/28* (2013.01); *H01F 41/04* (2013.01)

(58) Field of Classification Search
CPC .......... H01F 27/00; H01F 27/28; H01F 41/04; H02K 44/06; H02K 3/28; H02K 15/0435; H02K 15/066
See application file for complete search history.

(56) References Cited

U.S. PATENT DOCUMENTS

| | | |
|---|---|---|
| 4,859,885 A | 8/1989 | Kliman et al. |
| 2009/0267441 A1 | 10/2009 | Hiramatsu et al. |

(Continued)

OTHER PUBLICATIONS

Cea: "CEA/DTN/SPTA/LCIT", Jan. 16, 2012, Retrieved from the Internet: http://www.gedeon.prd.fr/ATELIERS/16_17_01_2012/exposes/16A/REY_Atelier_GEDEPEON_bilan.pdf (retreived on Aug. 24, 2018), p. 3; [Cited in International Search Report].

(Continued)

*Primary Examiner* — Adolf D Berhane
(74) *Attorney, Agent, or Firm* — Pearne & Gordon LLP (57) ABSTRACT

A magnetic inductor for an electromagnetic pump, the magnetic inductor being intended for being supplied with a polyphase current containing at least two phases, the magnetic inductor comprising a magnetic inductor body and for each of the phases of the polyphase current, N pairs of elementary coils with the same winding direction following one another. The connection between the elementary coils associated with the phase is as follows: for each from the first to the N-th pair, each of the first and second elementary coils has one of the ends thereof connected to the end of the same type as the elementary coil of the same type that directly follows same.

13 Claims, 6 Drawing Sheets

(56) References Cited

U.S. PATENT DOCUMENTS

2013/0328435 A1    12/2013  Wolf et al.
2021/0375539 A1*   12/2021  Vitry .................. H01F 41/0233

OTHER PUBLICATIONS

Specification and Drawings for U.S. Appl. No. 16/765,055 entitiled "Method for Assembling a Magnetic Inductor and Magnetic Inductor Able to be Obtained by Means of Such a Method" filed May 18, 2020.
International Search Report for PCT/FR2018/052905 dated Mar. 7, 2019.
Written Opinion for PCT/FR2018/052905 dated Mar. 7, 2019.
Search Report for French Application No. 1760946 dated Sep. 13, 2018.

* cited by examiner

MAGNETIC INDUCTOR, ELECTROMAGNETIC PUMP COMPRISING SUCH A MAGNETIC INDUCTOR AND METHOD FOR MANUFACTURING A MAGNETIC INDUCTOR

CROSS-REFERENCE TO RELATED APPLICATIONS

This is a National Stage application of PCT international application PCT/FR2018/052905, filed on Nov. 19, 2018, which claims the priority of French Patent Application No. 1760946, filed Nov. 20, 2017, both of which are incorporated herein by reference in their entirety.

TECHNICAL FIELD

The invention relates to the field of annular electromagnetic pumps and the magnetic inductors which equip them.

Thus, the object of the invention is a magnetic inductor, an electromagnetic pump including such a magnetic inductor and a method for manufacturing such a magnetic inductor.

PRIOR ART

In order to optimise the pumping capacity of annular electromagnetic pumps, it is known to equip them with two magnetic inductors, one internal, delimiting with a protection tube an internal wall of a channel of the electromagnetic pump, the other external, delimiting with a protection tube an external wall of the channel.

Figure 1A:
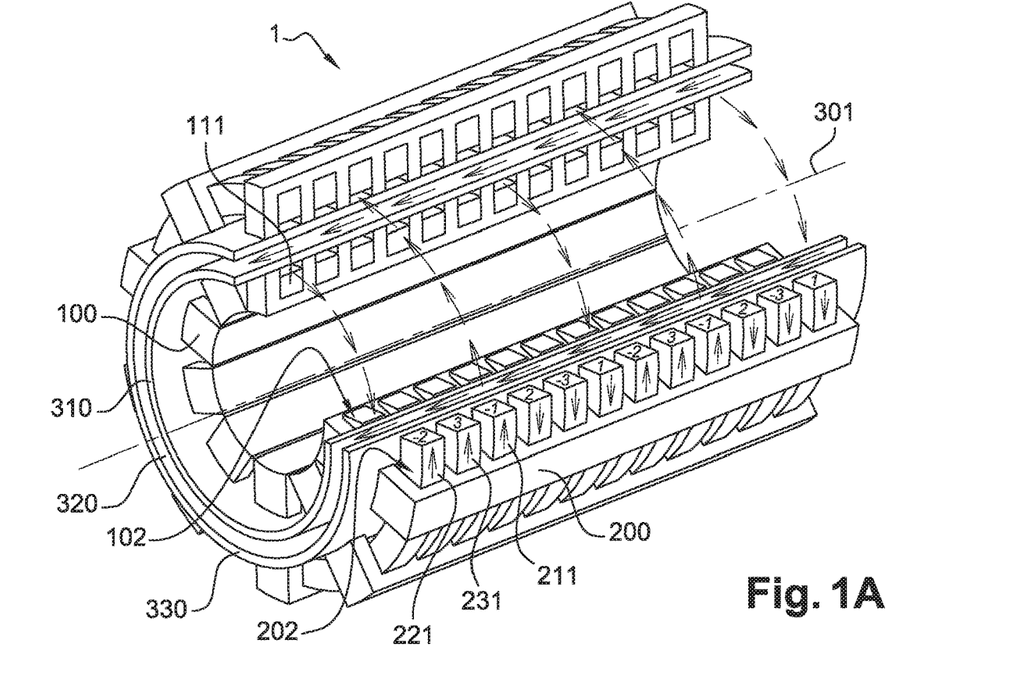
FIGS. 1A and 1B are respectively a figure illustrating the different parts of an electromagnetic pump comprising an internal magnetic inductor and an external magnetic inductor and a figure illustrating the pairwise power supply of the elementary coils with three-phase current, FIG. 2 schematically illustrates a pairwise coupling of the "direct series" type of the elementary coils of a magnetic inductor power supplied with three-phase, FIG. 3 schematically illustrates a pairwise coupling, of the "pair of coils" type, of the elementary coils of a magnetic inductor power supplied with three-phase.

Such an electromagnetic pump 1 thus includes, as illustrated in FIG. 1A and starting from a central axis 301 of the electromagnetic pump 1:
  the internal magnetic inductor 100 including a first plurality of elementary coils 111, 121, 131,
  the internal protection tube 310,
  the channel 320,
  the external protection tube 330,
  the external magnetic inductor 200 including a second plurality of elementary coils 211, 221, 231.

For each of the internal and external magnetic inductors 100, 200, the elementary coils 111, 121, 131, 211, 221, 231 follow one another along the central axis 301 of the electromagnetic pump 1. In order to generate a magnetic field sliding along the main axis, the elementary coils 111, 121, 131, 211, 221, 231 of the internal and external magnetic inductors 100, 200 are power supplied by a polyphase current, in FIG. 1A a three-phase current, with an adapted coupling diagram. It can thus be seen in FIG. 1A and for the external inductor 200, that the elementary coils 111, 121, 131, 211, 221, 231 are power supplied, from left to right, respectively and alternately by phase 2, then by phase 3 and then by phase 1. In the same way and in order to simulate a six-phase power supply, the winding direction of the elementary coils 111, 121, 131, 211, 221, 231 is also alternated, this alternation being shown in FIG. 1A by the minus sign indicated before the numeral reference of the phase.

Such a coupling and such an alternation of the winding direction of the elementary coils 111, 121, 131, 211, 221, 231 make the mounting of the magnetic inductors 100, 200 relatively complex. This is particularly the case for the internal magnetic inductor 100 for which the connection of the elementary coils 111, 121, 131 takes place in a central cavity of the magnetic body 101 of the internal magnetic inductor 100, as described in the document EP 0606972.

Figure 1B:
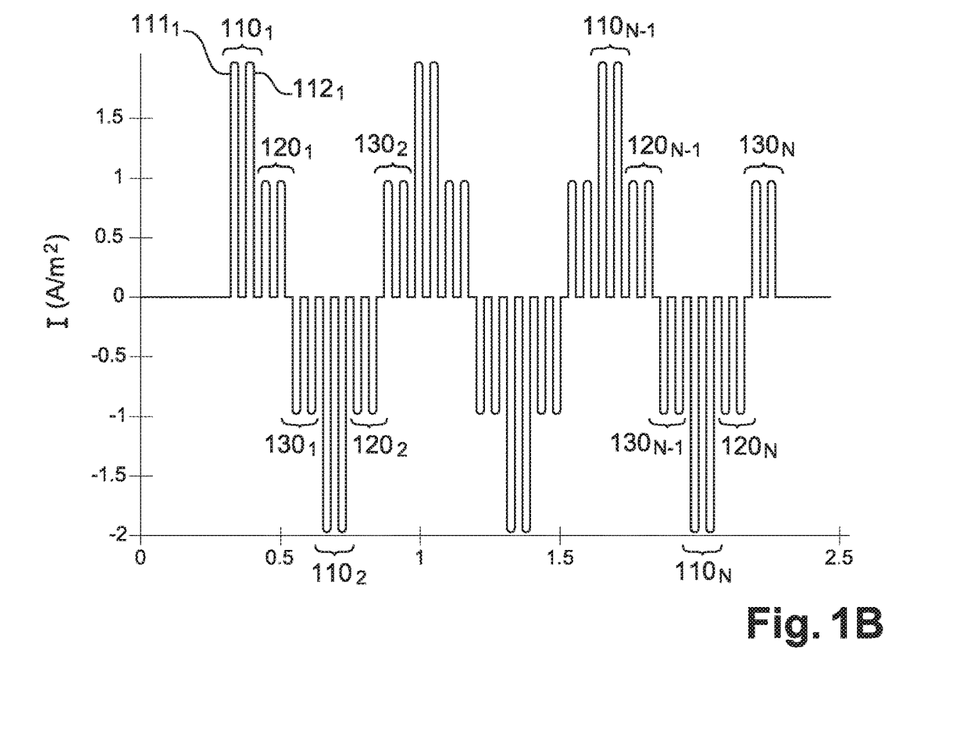

This mounting is further complicated by the fact that, as illustrated in FIGS. 1B and 1n a usual configuration of magnetic inductors 100, 200, the elementary coils 111, 121, 131, 211, 221, 231 are generally power supplied in pairs. Thus, in such a configuration, for each of the phases of the polyphase current, the magnetic inductor 100, 200 includes N pairs of elementary coils 111, 121, 131, 211, 221, 231 which follow one another from the first pair to $N^{th}$ pair along the magnetic inductor body 101, 201 each of the pairs of elementary coils 111, 121, 131, 211, 221, 231 comprising a first and a second elementary coil 111, 121, 131, 211, 221, 231 which follow one another along the inductor body 101, 201, each elementary coil 111, 121, 131, 211, 221, 231 including two ends, one of which is an input type end and the other of which is an output type end.

Figure 2:
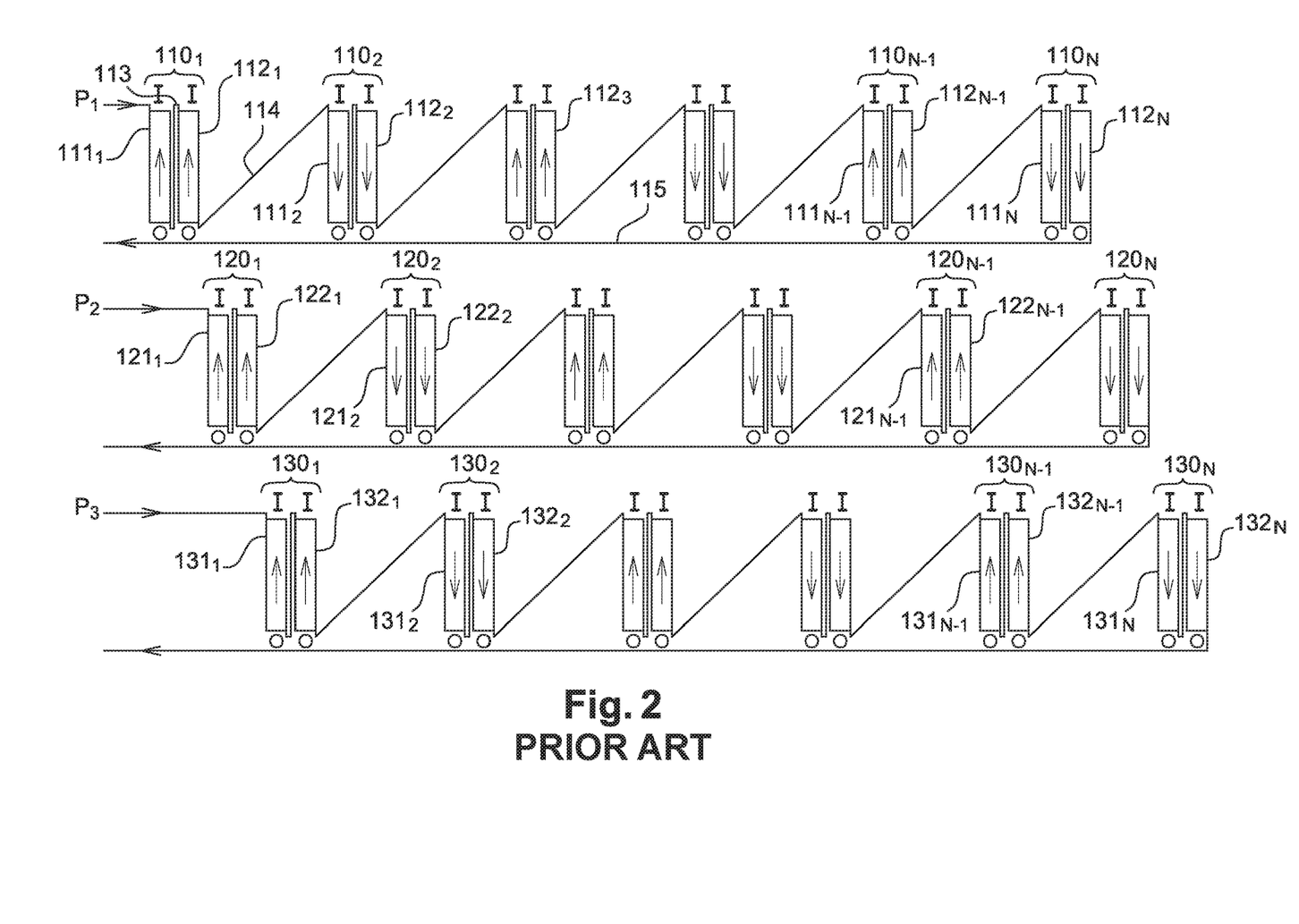
Figure 3:
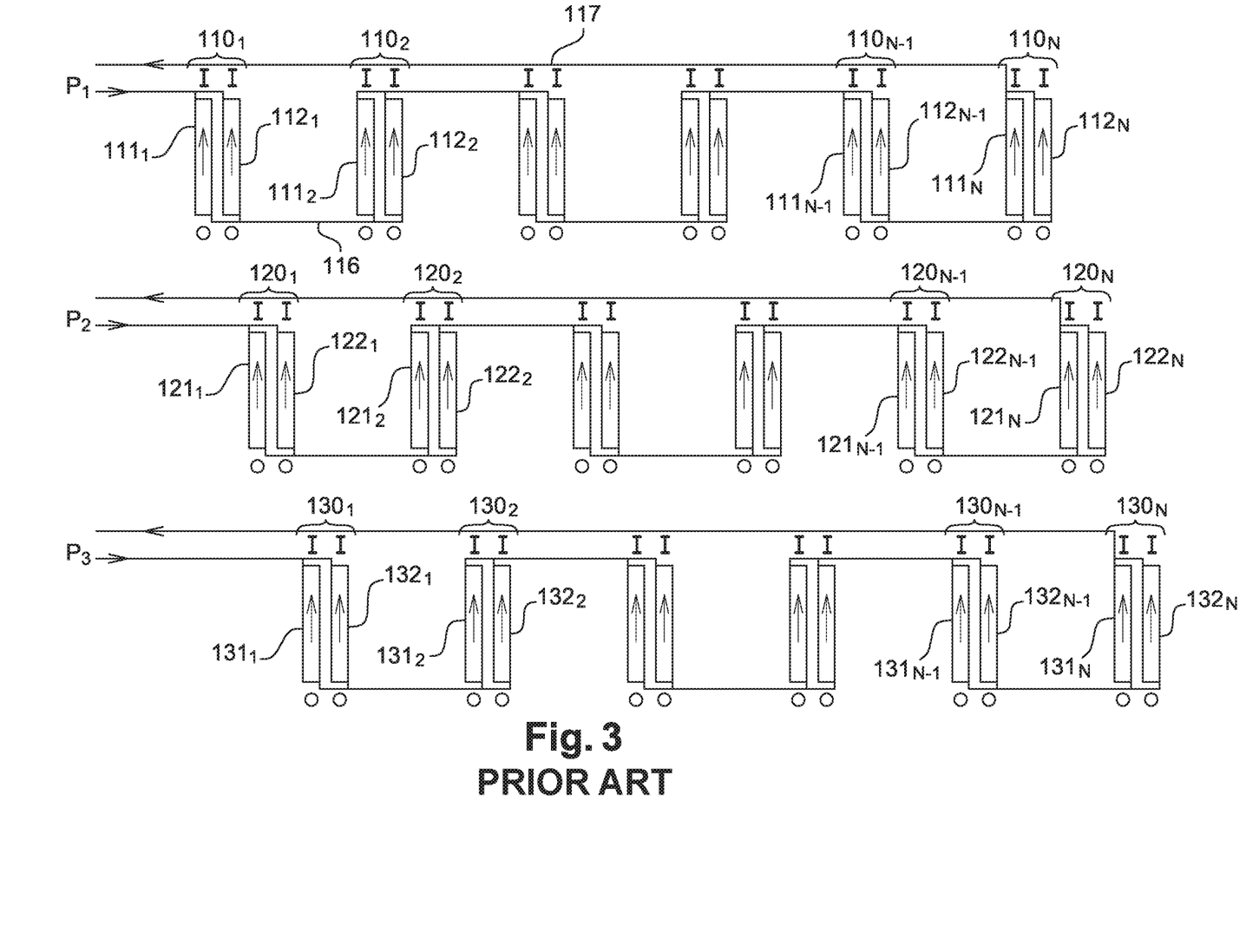

FIGS. 2 and 3 schematically show the coupling types currently used in the magnetic inductors having such a pairwise configuration $110_{1,2,\ldots,N-1,N}$, $120_{1,2,\ldots,N-1,N}$, $130_{1,2,\ldots,N-1,N}$ of elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$. In these two figures, the succession of the elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$ along the central axis 301 is shown with an artificial offset on three levels, each of the levels representing the coupling of the elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$ of a phase P1, P2, P3. FIGS. 2, 3 also illustrate the winding direction by means of an arrow and the inputs and outputs I, O of each of the elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$ by the respective references I and O.

FIG. 2 illustrates a coupling of the elementary coils called coupling "in direct series". In such a coupling, for each of the phases P1, P2, P3:
  the winding direction of the elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$ is alternated in pairs $110_{1,2,\ldots,N-1,N}$, $120_{1,2,\ldots,N-1,N}$, $130_{1,2,\ldots,N-1,N}$, along the central axis 301,
  the elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$ are connected in series along the central axis 301 this is applied for both the elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$ of the same pair and for two elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$ of two subsequent pairs $110_{1,2,\ldots,N-1,N}$, $120_{1,2,\ldots,N-1,N}$, $130_{1,2,\ldots,N-1,N}$,
  the first and last elementary coil $111_1$, $121_1$, $131_1$, $112_{1,2,\ldots,N-1,N}$, $122_{1,2,\ldots,N-1,N}$, $132_{1,2,\ldots,N-1,N}$ are respectively connected to a current input and to a current output of said phase P1, P2, P3.

With such a configuration, the link between the elementary coils of the same phase P1, P2, P3 is obtained with three types of conductors 113, 114, 115;
  a first type of conductor 113 connecting in series the elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$ of the same pair $110_{1,2,\ldots,N-1,N}$, $120_{1,2,\ldots,N-1,N}$, $130_{1,2,\ldots,N-1,N}$,
  a second type of conductor 114 connecting the second elementary coil $112_{1,2,\ldots,N-1,N}$, $122_{1,2,\ldots,N-1,N}$ $132_{1,2,\ldots,N-1,N}$, of a pair $110_{1,2,\ldots,N-1}$, $120_{1,2,\ldots,N-1}$, $130_{1,2,\ldots,N-1}$, with the first elementary coil $111_{2,\ldots,N-1,N}$, $122_{2,\ldots,N-1,N}$, $132_{2,\ldots,N-1,N}$ of the pair $110_{2,\ldots,N-1,N}$, $120_{2,\ldots,N-1,N}$, $130_{2,\ldots,N-1,N}$ that directly follows along the magnetic inductor body 101, a third type of conductor 115 connecting the second elementary coil $112_N$, $122_N$, $132_N$ of the last pair $110_N$, $120_N$, $130_N$ with the output of said phase P1, P2, P3.

It will be noted that it is also known, according to a possibility which is not shown and in the case only of the external inductor which does not have the same space constraints as the internal inductor, an arrangement of the elementary coils wherein the elementary coils of the same pair are coupled in series and has an inverted winding direction. Such a possibility, in addition to the fact that such a coupling has a space requirement larger than the coupling described above, has the same disadvantages as the coupling of the elementary coils called coupling "in direct series" described above.

FIG. 3 illustrates a coupling of the elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$ called coupling "in pairs of coils". In such a coupling, for each of the phases P1, P2, P3:

the set of elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$ have identical winding directions, the first and second elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$ of the same pair $110_{1,2,\ldots,N-1,N}$, $120_{1,2,\ldots,N-1,N}$, $130_{1,2,\ldots,N-1,N}$, are connected in parallel, for each of the first to the N−1$^{st}$ pair, the elementary coils $111_{1,2,\ldots,N-1}$, $112_{1,2,\ldots,N-1}$, $121_{1,2,\ldots,N-1}$, $122_{1,2,\ldots,N-1}$, $131_{1,2,\ldots,N-1}$, $132_{1,2,\ldots,N-1}$ have one of their two ends I, O connected to the end of the same type of elementary coils $111_{2,\ldots,N-1,N}$, $121_{2,\ldots,N-1,N}$, $122_{2,\ldots,N-1,N}$, $131_{2,\ldots,N-1,N}$, $132_{2,\ldots,N-1,N}$ of the pair which follows it along the central axis 301, for each of the second to the N$^{th}$ pair $110_{2,\ldots,N-1,N}$, $120_{2,\ldots,N-1,N}$, $130_{2,\ldots,N-1,N}$, the elementary coils $111_{2,\ldots,N-1,N}$, $112_{2,\ldots,N-1,N}$, $121_{2,\ldots,N-1,N}$, $122_{2,\ldots,N-1,N}$, $131_{2,\ldots,N-1,N}$, $132_{2,\ldots,N-1,N}$, have one of their two ends I, O connected to the end of the same type of the elementary coils $111_{1,2,\ldots,N-1}$, $112_{1,2,\ldots,N-1}$, $121_{1,2,\ldots,N-1}$, $122_{1,2,\ldots,N-1}$, $131_{1,2,\ldots,N-1}$, $132_{1,2,\ldots,N-1}$ of the pair $110_{1,2,\ldots,N-1}$, $120_{1,2,\ldots,N-1}$, $130_{1,2,\ldots,N-1}$, which precedes it along the central axis 301.

Thus for the second to N−1$^{st}$ pair $110_{2,\ldots,N-1}$, $120_{2,\ldots,N-1}$, $130_{2,\ldots,N-1}$, the elementary coils $111_{2,\ldots,N-1}$, $112_{2,\ldots,N-1}$, $121_{2,\ldots,N-1}$, $122_{2,\ldots,N-1}$, $131_{2,\ldots,N-1}$, $132_{2,\ldots,N-1}$ of a pair have one of their two ends I, O connected to the end of the same type of the elementary coils $111_{\ldots,N-1}$, $112_{\ldots,N-1}$, $121_{\ldots,N-1}$, $122_{\ldots,N-1}$, $131_{\ldots,N-1}$, $132_{\ldots,N-1,N}$ of the pair $110_{\ldots,N-1,N}$, $120_{\ldots,N-1,N}$, $130_{\ldots,N-1,N}$ which follows it along the central axis 301 and the other of their two ends I, O connected to the end of the same type of the elementary coils $111_{1,2,\ldots}$, $112_{1,2,\ldots}$, $121_{1,2,\ldots}$, $122_{1,2,\ldots}$, $131_{1,2,\ldots}$, $132_{1,2,\ldots}$ of the pair $110_{1,2,\ldots}$, $120_{1,2,\ldots}$, $130_{1,2,\ldots}$ which precedes it along the central axis 301.

With such a configuration, the link between the elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$ of the same phase P1, P2, P3 is obtained with two types of conductors 116, 117:

a first type of conductor 116 connecting together the elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$ of two subsequent pairs $110_{1,2,\ldots,N-1,N}$, $120_{1,2,\ldots,N-1,N}$, $130_{1,2,\ldots,N-1,N}$, a second type of conductor 117 connecting the second elementary coil $112_N$, $122_N$, $132_N$ of the last pair $110_N$, $120_N$, $130_N$ with the output of said phase P1, P2, P3.

These two coupling types thus allow, from a three-phase current source, simulating a six-phase power supply with a pairwise arrangement of the elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$. However, they have a number of disadvantages.

Indeed, the coupling "in direct series" requires alternating the winding direction of the elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$, the risks of reversal in the winding direction during mounting of the magnetic inductor 100 are therefore very significant. In addition, a magnetic inductor having this type of coupling is particularly sensitive to the effects of thermal expansion of the elementary coils, the conductors 104 of the first type indeed have a dimensioning which is hardly adapted to support such expansion.

With the coupling "in pairs of coils", the elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$ of the same pair $110_{1,2,\ldots,N-1,N}$, $120_{1,2,\ldots,N-1,N}$, $130_{1,2,\ldots,N-1,N}$ are connected in parallel. Consequently the conductors 116 of the first type connecting two subsequent pairs $110_{1,2,\ldots,N-1,N}$, $120_{1,2,\ldots,N-1,N}$, $130_{1,2,\ldots,N-1,N}$ to the other must have connectors dimensioned to allow connection to the two elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$ each composing pairs $110_{1,2,\ldots,N-1,N}$, $120_{1,2,\ldots,N-1,N}$, $130_{1,2,\ldots,N-1,N}$. However, such a dimensioning of the connectors is little adapted to withstand the forces of thermal expansion.

Thus regardless of the coupling used for the pairs of elementary coils, the magnetic inductors have a low resistance to thermal expansion of the elementary coils and are therefore not compatible with high powers. It should be noted that this remark is especially true for the internal magnetic inductors which have only a small heat exchange surface, their external surface being coated with the internal protection tube.

DESCRIPTION OF THE INVENTION

The invention aims at overcoming this problem and thus has the purpose of providing a magnetic inductor having better tolerance to the thermal expansion of the elementary coils.

To this end, the invention relates to a magnetic inductor for an electromagnetic pump, the magnetic inductor being intended to be power supplied by means of a polyphase current comprising several phases, the magnetic inductor comprising:

a magnetic inductor body extending longitudinally, for each of the phases of the polyphase current, N pairs of elementary coils of the same winding direction following one another from the first pair to the N$^{th}$ pair along the magnetic body, N being an integer greater than or equal to 2, each of the pairs comprising a first and a second elementary coil which follow one another along the inductor body, each elementary coil including two ends, one of which is an input type end and the other of which is an output type end, wherein the pairs of elementary coils are distributed along the inductor body so as to provide a phase alternation and to provide a magnetic field sliding along the inductor body, wherein the pairs of elementary coils are distributed along the inductor body so as to provide a phase alternation and to provide a magnetic field sliding along the inductor body.

For each of the phases:
the first and the second elementary coil of the first pair are intended to be respectively connected to one of a current input and a current output of said phase and to the other of the current input and the current output of said phase;
for each of the first to the N−1$^{st}$ pair, one end of the first elementary coil has one of the ends thereof connected to the end of the same type of the first coil which directly follows it along the inductor body;
for each of the second to N$^{th}$ pair, one end of the second elementary coil has one of the ends thereof connected to the end of the same type of the second elementary coil which directly precedes it along the magnetic inductor body; and
for the N$^{th}$ pair, the first and second elementary coils are connected in series.

In such a magnetic inductor, the connections between elementary coils of the same phase are made between coils of the same type of two consecutive pairs, with the exception of the last pair, the first and second coils of the same pair are not connected to each other. Thus, the conductors used to connect the elementary coils have a dimensioning equivalent to the distance between two consecutive pairs which is sufficient to absorb the thermal expansions of the elementary coils.

Moreover, since such a coupling is not based on a parallel coupling of the elementary coils of the same pair, a single elementary coil is coupled at each end of a given conductor. The connector allowing the connection is therefore little sensitive to the thermal expansion of the elementary coils. Such a magnetic inductor therefore has a particularly optimised resistance to thermal expansions of the elementary coils.

In addition, with such a coupling, each elementary coil is coupled to an elementary coil of the previous pair and an elementary coil of the subsequent pair. Consequently, in the case where the conductors allowing the coupling are distributed outside the inductor body, these conductors allow increasing the mechanical strength of the inductor body.

The magnetic inductor body may include a delimiting surface intended to be facing a channel of the electromagnetic pump,
the magnetic inductor body including on its delimiting surface a plurality of transverse grooves which follow one another along the magnetic inductor body and wherein the elementary coils are housed.

In this way the elementary coils are as close as possible to the pump channel and the pumping is optimised.

Each of the elementary coils connected to another elementary coil is connected by means of a respective electrical conductor which extends along the delimiting surface.

In this way, when the inductor is an internal inductor, the conductors do not have to be housed inside the inductor body and they fully participate in the mechanical cohesion of the inductor.

The magnetic inductor body may further include on its surface longitudinal grooves wherein the electrical conductors are housed.

With such grooves, the compactness of the inductor is improved.

The magnetic inductor body may include a plurality of magnetic plates extending along a main axis and having a cross section in the shape of an involute of a circle, the magnetic plates being interlocked with their circle of the involute of a circle merged together in the shape of a tube extending longitudinally along the main axis, said tube forming the magnetic inductor body.

With such magnetic plates in the shape of an involute of a circle, it is possible to use only one type of plate to form the entire inductor body. It is thus not necessary, as is the case in the prior art, to provide a plurality of inductor plate shapes. The mounting method is also greatly facilitated, since the plates are interchangeable.

The magnetic inductor can be an internal magnetic inductor intended to delimit with a protection tube an internal wall of a channel of the electromagnetic pump.

Such a magnetic inductor particularly benefits from the advantages related to the invention and particularly from the possibility provided by the invention as regards the compactness and the possibility of being able to place the conductors along the delimiting surface.

The magnetic inductor can be an external magnetic inductor intended to delimit with a protection tube an external wall of a channel of the electromagnetic pump.

The invention also relates to an electromagnetic pump including at least one first magnetic inductor according to the invention.

The invention also relates to an electromagnetic pump including at least one second magnetic inductor according to the invention.

The electromagnetic pump may also include a first and a second inductor according to the invention.

Such an electromagnetic pump benefits from the advantages associated with the inductor according to the invention which equips it.

The invention also relates to a method for manufacturing a magnetic inductor for an electromagnetic pump, the magnetic inductor being intended to be power supplied by means of a polyphase current comprising several phases, the method being characterised in that it comprises the following steps:
providing a magnetic inductor body,
providing and connecting, for each of the phases of the polyphase current, N pairs of elementary coils of the same winding direction following one another from the first pair to the N$^{th}$ pair along the inductor body, N being an integer greater than or equal to 2, each of the pairs comprising a first and a second elementary coil which follow one another along the inductor body, each elementary coil including two ends, one of which is an input type end and the other of which is an output type end, with, for each of the phases:
the first and the second elementary coil of the first pair are intended to be respectively connected to one of the current input and the current output of said phase and to the other of the current input and the current output of said phase;
for each of the first to the N−1$^{st}$ pair, the first elementary coil has one of the ends thereof connected to the end of the same type of the first elementary coil that directly follows it along the inductor body;
for each of the second to N$^{th}$ pair, the second elementary coil has one of the ends thereof connected to the end of the same type of the second elementary coil which directly precedes it along the magnetic inductor body; and for the $N^{th}$ pair the first and second elementary coils are connected in series.

Such a method allows to provide an inductor according to the invention and therefore to benefit from the advantages associated therewith.

The magnetic inductor body may include a plurality of magnetic plates extending along a main axis and having a cross section in the shape of an involute of a circle, the step of providing the magnetic inductor body includes the following sub-steps:

providing the plurality of identical magnetic plates, each of the magnetic plates extending along a main axis and having a cross section in the shape of an involute of a circle, assembling the plurality of magnetic plates by interlocking in order to form the magnetic inductor body, the circle of the involute of a circle of the magnetic plates being merged together.

Such a method allows easily providing an inductor according to the invention since it is necessary to use only one type of magnetic plates.

"Identical magnetic plates" means, in the above and in the rest of this document, that the magnetic plates have an identical shape, within given tolerances.

The step of providing the magnetic inductor body may further include the following sub-step:

cutting the transverse grooves 102 in a longitudinal surface of the tubular body from an internal longitudinal surface and an external longitudinal surface in order to form a housing for the elementary coils, the provision and connection provision and connection step including the following sub-steps:

providing elementary coils, placing the elementary coils in the transverse grooves formed during the cutting step.

With such a cutting, it is easy to provide the housing for the coils. The manufacturing method is thereby facilitated relative to the methods of the prior art wherein the magnetic plates necessarily have pre-cuts.

BRIEF DESCRIPTION OF THE DRAWINGS

The present invention will be better understood upon reading the description of exemplary embodiments, given in a purely indicative and non-limiting manner, with reference to the appended drawings wherein.

Identical, similar or equivalent parts of the different figures have the same reference numerals so as to facilitate the passage from one figure to another.

The different parts shown in the figures are not necessarily shown on a uniform scale, to make the figures more readable.

DETAILED DESCRIPTION OF PARTICULAR EMBODIMENTS

FIG. 1A, already described in connection with the prior art, illustrates an electromagnetic pump including two magnetic inductors 100, 200, one internal, the other external.

Thus, such an electromagnetic pump 1 includes, starting from a central axis 301 of the electromagnetic pump 1:

the internal magnetic inductor 100 including a first plurality of elementary coils 111, the internal protection tube 310, the channel 320, the external protection tube 330, the external magnetic inductor 200 including a second plurality of elementary coils 211.

Each magnetic inductor 100, 200 includes:

a magnetic inductor body 101, 201, the plurality of elementary coils 111, 211, conductors, not shown in FIG. 1A, allowing to connect the elementary coils together and to connect them to the first, second and third phases, not shown in FIG. 1A.

For each of the magnetic inductors 100, 200, the magnetic inductor body 101, 201 has a tubular shape centred around a central axis 301 of said magnetic inductor 100, 200. The magnetic inductor body 101 includes a plurality of transverse grooves 102, 202 which follow one another along the inductor body, each of the transverse grooves 102, 202 housing a corresponding elementary coil 111, 211. The magnetic inductor body 101, 202 includes a plurality of non-illustrated radial magnetic plates assembled together.

In the context of the invention, the electromagnetic pump 1 includes at least one magnetic inductor 100, 200 from the internal magnetic inductor 100 and the external magnetic inductor 200, preferably both, having a coupling of elementary coils 111, 211 according to the invention. Such a coupling according to the invention is particularly advantageous for an internal magnetic inductor 100 according to the invention, this is in particular because of the possibility that it provides of making the connection between the elementary coils 111 on the external surface of the magnetic inductor body 101 and not inside the magnetic inductor body 101 as is the case for the prior art. Thus, only the coupling of an internal magnetic inductor 100 is described in detail. Of course, on the basis of this document, a person skilled in the art is perfectly capable of applying this teaching described for an internal magnetic inductor 100 to an external magnetic inductor 200 without having to demonstrate any inventive step.

Figure 4A:
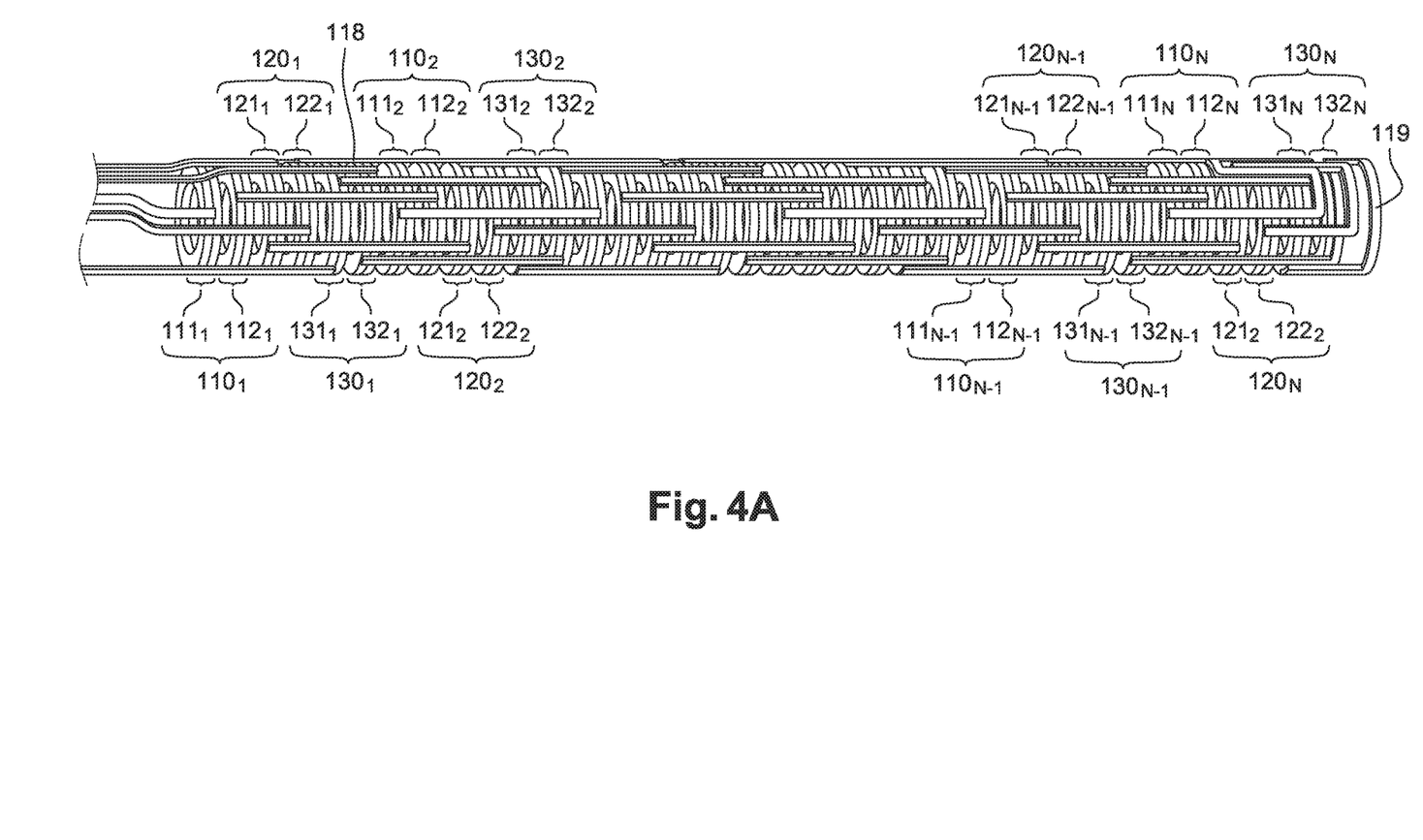
FIGS. 4A, 4B and 4C illustrate respectively a perspective view of the winding circuit of a magnetic inductor according to the invention, a schematic view of the pairwise coupling of elementary coils according to the invention, and a perspective view of the internal magnetic inductor according to the invention, FIGS. 5A and 5B respectively illustrate a schematic sectional view of an elementary coil equipping the magnetic inductor illustrated in FIG. 4C and a perspective view of an elementary coil.
Figure 4B:
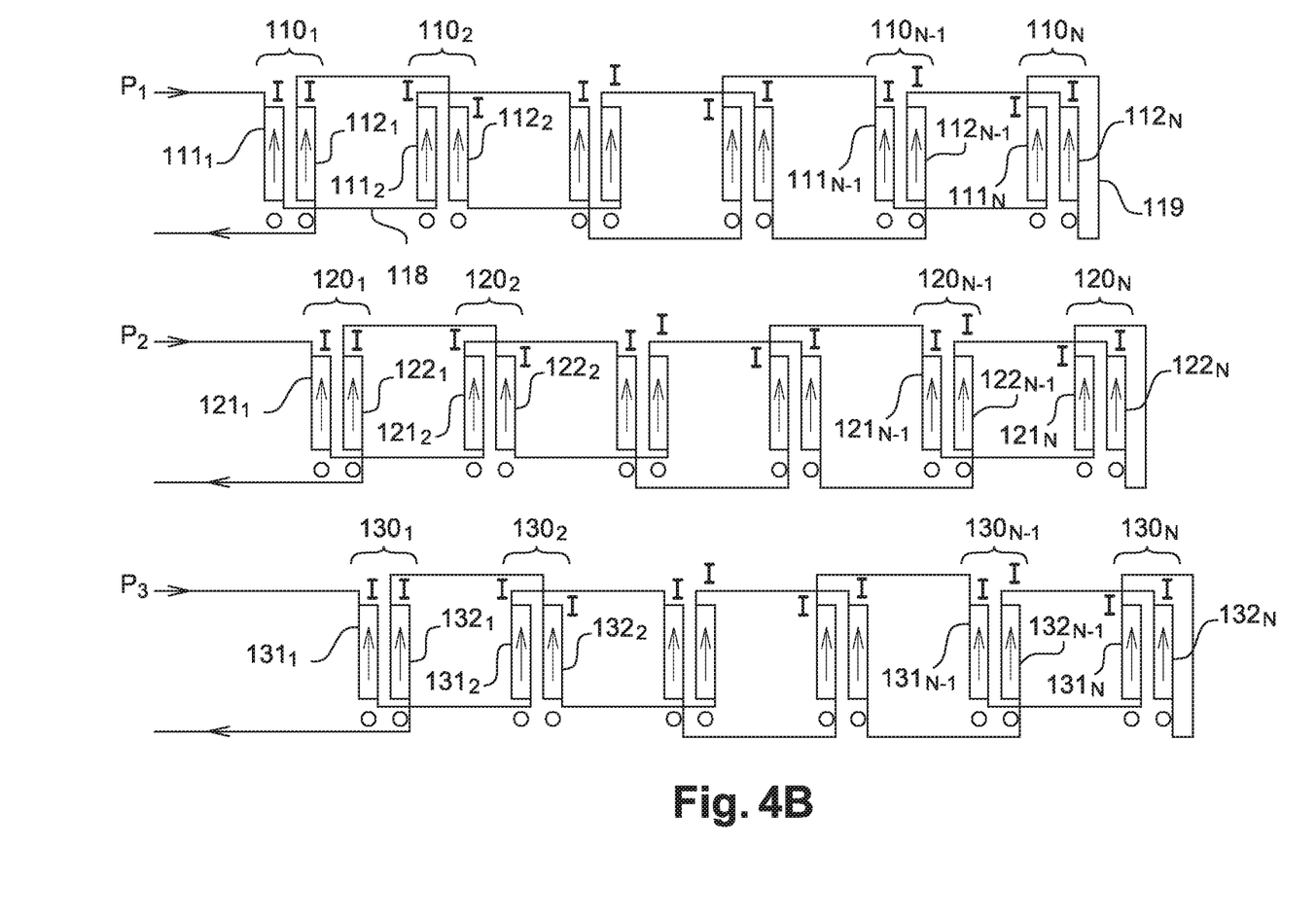

Such a coupling is illustrated in FIG. 4A and schematised in FIG. 4B.

Thus, it can be seen in these FIGS. 4A and 4B that for each of the phases P1, P2, P3 of the polyphase current, the magnetic inductor 100 includes N pairs $110_{1,2,\ldots,N-1,N}$, $120_{1,2,\ldots,N-1,N}$, $130_{1,2,\ldots,N-1,N}$ of elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$, of the same winding direction following one another from the first pair $110_1$, $120_1$, $130_1$ to the $N^{th}$ pair $110_N$, $120_N$, $130_N$ along the magnetic body 101, N being an integer greater than or equal to 2. Each of the pairs $110_{1,2,\ldots,N-1,N}$, $120_{1,2,\ldots,N-1,N}$, $130_{1,2,\ldots,N-1,N}$ comprises a first and a second elementary coil $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$ which follow one another along the magnetic inductor body 101. Each elementary coil $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$ includes two ends I, O, namely an input type end I and an output type end O.

Of course, in accordance with the operating principle of a coil, the differentiation between the input end I and the output end O is purely artificial. Indeed, the substitution of one by the other is equivalent to a simple reversal of the winding direction of said coil. Thus, the connections which are described above are valid regardless of the choice between the input I and the output O, to the extent that said convention is identical to all the elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$ of the magnetic inductor 100.

The pairs $110_{1,2,\ldots,N-1,N}$, $120_{1,2,\ldots,N-1,N}$, $130_{1,2,\ldots,N-1,N}$ of elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$ are distributed along the magnetic inductor body 101 so as to provide a phase alternation P1, P2, P3 and provide a magnetic field sliding along the magnetic inductor body 101.

The connection between the elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$ associated with the same phase of the first, the second and the third phase P1, P2, P3 is described below.

Thus, for a given phase P1, P2, P3, the first and the second elementary coil $111_1$, $112_1$, $121_1$, $122_1$, $131_1$, $132_1$ of the first pair $110_1$, $120_1$, $130_1$ are respectively connected to one of the current input and the current output of said phase P1, P2, P3 and to the other of the current input and the current output of said phase P1, P2, P3. Thus, as can be seen in FIG. 4B, for the first and the third phase P1, P3, the first elementary coil $111_1$, $131_1$ has its input I connected to the current input of said phase P1, P3 while the second elementary coil $112_1$, $132_1$ has its output connected to the current output of said phase P1, P3. For the second phase P2, the first elementary coil $121_1$ has its input I connected to the current output of said phase P2 while the second elementary coil $122_1$ has its output connected to the current input of said phase P2.

For this same given phase P1, P2, P3, and for each of the first to the N-$1^{st}$ pair $110_{1,2,\ldots,N-1}$, $120_{1,2,\ldots,N-1}$, $130_{1,2,\ldots,N-1}$ associated with said phase P1, P2, P3, the first elementary coil $111_{1,2,\ldots,N-1}$, $121_{1,2,\ldots,N-1}$, $131_{1,2,\ldots,N-1}$ has one of the ends I, O thereof connected to the end of the same type of the first elementary coil $111_{1,2,\ldots,N-1}$, $121_{1,2,\ldots,N-1}$, $131_{1,2,\ldots,N-1}$ which directly follows it along the magnetic inductor body 101. Similarly, for each of the second to $N^{th}$ pair $110_{2,\ldots,N-1,N}$, $120_{2,\ldots,N-1,N}$, $130_{2,\ldots,N-1,N}$, N associated with said phase P1, P2, P3, the second elementary coil $112_{2,\ldots,N-1,N}$, $122_{2,\ldots,N-1,N}$, $132_{2,\ldots,N-1,N}$ has one of the ends I, O thereof connected to the end of the same type of the second elementary coil $112_{2,\ldots,N-1,N}$, $122_{2,\ldots,N-1,N}$, $132_{2,\ldots,N-1,N}$ which directly precedes it along the magnetic inductor body 101.

Thus, as can be seen in FIG. 4B, for all the phases P1, P2, P3, the first elementary coil $111_1$, $121_1$, $131_1$ of the first pair $110_1$, $120_1$, $130_1$ has its output O connected to the output O of the first elementary coil $111_2$, $121_2$, $131_2$ of the second pair $110_2$, $120_2$, $130_2$. This same first elementary coil $111_2$, $121_2$, $131_2$ of the second pair $111_2$, $121_2$, $131_2$ has in turn its input I connected to the input I of the first elementary coil of the third pair, which is not referenced. For these same phases P1, P2, P3, the second elementary coil $112_N$, $122_N$, $132_N$ of the last pair $110_N$, $120_N$, $130_N$ has its input I connected to the input I of the second elementary coil $112_{N-1}$, $122_{N-1}$, $132_{N-1}$ of the penultimate pair $110_{N-1}$, $120_{N-1}$, $130_{N-1}$. This same second elementary coil $112_{N-1}$, $122_{N-1}$, $132_{N-1}$ of said phase P1, P2, P3 has its output O connected to the output O of the second coil, which is not referenced, of the pair N-2, which is not referenced.

For each of the first to the third phase P1, P2, P3, the first and second elementary coils $111_N$, $112_N$, $121_N$, $122_N$, $131_N$, $132_N$ of the $N^{th}$ pair $110_N$, $120_N$, $130_N$ are connected in series. Thus the first elementary coil $111_N$, $121_N$, $131_N$ of the last pair $110_N$, $120_N$, $130_N$ has its input I connected to the output O of the second elementary coil $112_N$, $122_N$, $132_N$ of this same last pair $110_N$, $120_N$, $130_N$.

Figure 4C:
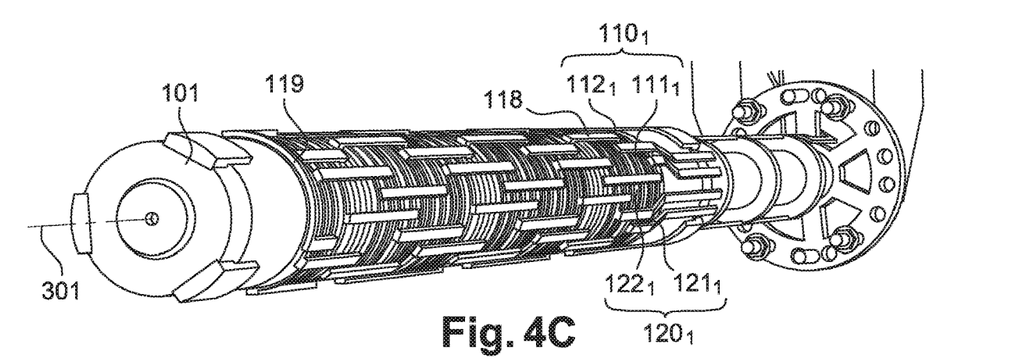

With such a coupling, as illustrated in FIG. 4C, the link between the elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$ is provided by means of a first and second type of conductors 118, 119.

The first type of conductor 118 allows connecting the elementary coils of two successive pairs, for example the outputs of the first elementary coils $111_1$, $111_2$, $121_1$, $121_2$, $131_1$, $131_2$ of the first and the second pair $110_1$, $110_2$, $120_1$, $120_2$, $130_1$, $130_2$. This first type of conductor 118 can be, as illustrated in FIG. 4B, in the form of a straight conductive bar. This first type of conductor 118 extends over a length corresponding to the distance between two elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$, of two pairs $110_{1,2,\ldots,N-1,N}$, $120_{1,2,\ldots,N-1,N}$, $130_{1,2,\ldots,N-1,N}$ following one another. Such a length of a conductor 118 of the first type allows good tolerance to thermal expansion of the elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$ to be obtained, since the deformations related to such thermal expansion are distributed over the entire length of the conductor 118.

The second type of conductor 119 allows connecting the first and the second elementary coil $111_N$, $112_N$, $121_N$, $122_N$, $131_N$, $132_N$ of the last pair $110_N$, $120_N$, $130_N$ in series. In order to provide a good tolerance to the thermal expansion of the elementary coils, the second type of conductor 119 has, as illustrated in FIGS. 4A, 4C:

either a U-shape, for the conductors 119 corresponding to the second and third phase P2, P3, the two branches of the U extending parallel to the central axis 101 and the base of the U extending in a circular arc centred around the central axis 101 of the inductor body and the diameter of which is greater than the external diameter of the inductor body, or an M-shape, for the conductor 119 corresponding to the first phase P1, the four branches of the M parallel to the central axis 101 and being connected in pairs by a respective segment extending in a circular arc centred around the central axis 101 of the inductor body and the diameter of which is greater than the external diameter of the inductor body. Thus, with such U and M shapes, the second type of conductor 119 can extend along the external perimeter of the magnetic inductor body 101 without interfering with each other.

FIG. 4C illustrates the arrangement of the elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$ and the conductors 118, 119 connecting them along the magnetic inductor body 101. It can thus be seen in this figure that each of the elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$ is disposed in a lateral groove 102 corresponding to the magnetic inductor body 101.

Particularly, FIG. 6A is a close-up sectional schematic view showing the installation of an elementary coil 111 disposed in a lateral groove 102 of the magnetic inductor body 101. In this figure, it can be seen that the elementary coil 111 consists of 10 turns S distributed in two columns of 5 turns S. The turns of the first column are connected to the turns S of the second column by the respective innermost turn D, that is to say the closest turn to the central axis 301 of the magnetic inductor body 101. In order to insulate the turns S from one another, a dielectric coating the conductive material constituting each of the turns S is provided. An additional dielectric layer can also be provided on the walls of the lateral groove 102 in order to electrically insulate the elementary coil 111 from the magnetic inductor body 101. The two outer turns S, that is to say the one furthest from the central axis 301 of the magnetic inductor body 101, of the elementary coil 111 includes the input and output ends I, O, these input and output having been artificially put on the same plane in order to make them both appear.

It can be seen in FIG. 6B that the input I and the output O of each of the elementary coils are disposed at an angle α of 100 relative to one another. Of course, such an angle is given as an example and other α are perfectly possible without departing from the scope of the invention. Particularly, it is possible that the angle α between the input and output ends I, O, can be less than 90° C. and preferably comprised between 50° and 70°, this same angle α being advantageously substantially equal to 60°.

As illustrated in FIGS. 4A and 4C, two elementary coils $111_{1,2,\ldots,N-1}$, $112_{1,2,\ldots,N-1}$, $121_{1,2,\ldots,N-1}$, $122_{1,2,\ldots,N-1}$, $131_{1,2,\ldots,N-1}$, $132_{1,2,\ldots,N-1}$ of the same pair $110_{1,2,\ldots,N-1}$, $120_{1,2,\ldots,N-1}$, $130_{1,2,\ldots,N-1}$, except those $111_N$, $112_N$, $121_N$, $122_N$, $131_N$, $132_N$ of each $N^{th}$ pair $110_N$, $120_N$, $130_N$, have their inputs I offset from one another at an angle substantially equal to 20°. In the same way:

the elementary coils $121_{1,2,\ldots,N-1}$, $122_{1,2,\ldots,N-1}$ of the second phase P2 are offset at an angle substantially equal to 20° from the elementary coils $111_{1,2,\ldots,N-1}$, $112_{1,2,\ldots,N-1}$, of the first phase P1, and the elementary coils $131_{1,2,\ldots,N-1}$, $132_{1,2,\ldots,N-1}$ of the third phase P3 are offset at an angle substantially equal to 20° from the elementary coils $121_{1,2,\ldots,N-1}$, $112_{1,2,\ldots,N-1}$ of the second phase P2.

With such a conformation, the conductors 118 of the first type allowing to connect two elementary coils 111 of two pairs of the same phase which follow one another without risk of interference with another conductor 118 whether it is that of the corresponding phase or that of another phase.

Regarding the elementary coils of the $N^{th}$ pair, the respective angles between the first and second elementary coils of each of the pairs are as follows:

for the first phase P1, the angle between the first and the second elementary coil $111_N$, $112_N$ of the $N^{th}$ pair $110_N$ is 130°, for the second phase P2, the angle between the first and the second elementary coil $121_N$, $122_N$ of the $N^{th}$ pair $120_N$ is 80°, for the third phase P2, the angle between the first and the second elementary coil $131_N$, $132_N$ of the $N^{th}$ pair $130_N$ is 150°.

Figure 5A:
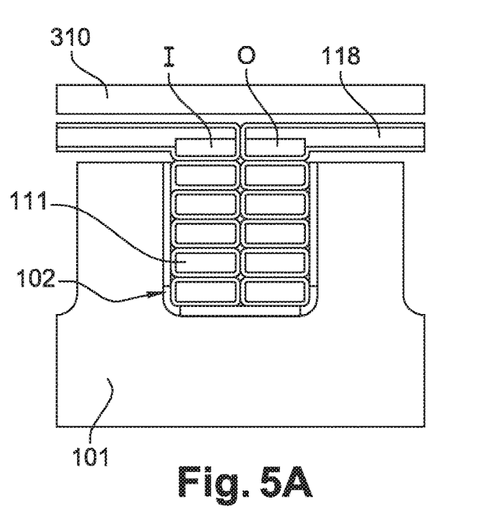
Figure 5B:
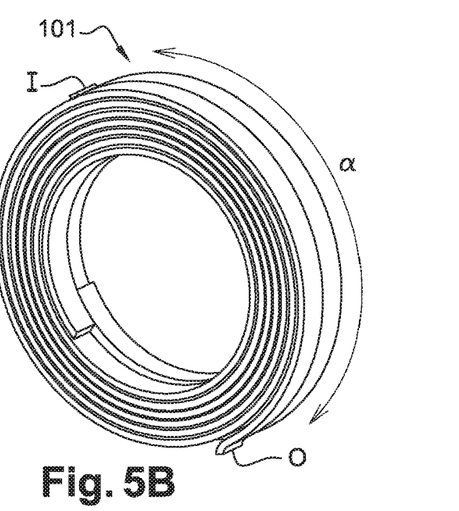

Of course, all these angles are given as an example and correspond to the shapes of the conductors 119 of the second type as illustrated on FIGS. 5A to 5C.

A magnetic inductor 100 according to the invention can be formed during a manufacturing method including the following steps:

providing a magnetic inductor body 101, providing and connecting, for each of the phases P1, P2, P3 of the polyphase current, N pairs $110_{1,2,\ldots,N-1,N}$, $120_{1,2,\ldots,N-1,N}$, $130_{1,2,\ldots,N-1,N}$ of elementary coils $111_{1,2,\ldots,N-1,N}$, $121_{1,2,\ldots,N-1,N}$, $131_{1,2,\ldots,N-1,N}$, $112_{1,2,\ldots,N-1,N}$, $122_{1,2,\ldots,N-1,N}$, $132_{1,2,\ldots,N-1,N}$ with the same winding direction following one another from the first pair $110_1$, $120_1$, $130_1$ to $N^{th}$ pair $110_N$, $120_N$, $130_N$ along the magnetic inductor body 101, N being an integer greater than or equal to 2, each of the pairs $110_{1,2,\ldots,N-1,N}$, $120_{1,2,\ldots,N-1,N}$, $130_{1,2,\ldots,N-1,N}$ comprising a first and a second elementary coil $111_{1,2,\ldots,N-1,N}$, $121_{1,2,\ldots,N-1,N}$, $131_{1,2,\ldots,N-1,N}$, $112_{1,2,\ldots,N-1,N}$, $122_{1,2,\ldots,N-1,N}$, $132_{1,2,\ldots,N-1,N}$ which follow one another along the magnetic inductor body 101, each elementary coil $111_{1,2,\ldots,N-1,N}$, $121_{1,2,\ldots,N-1,N}$, $131_{1,2,\ldots,N-1,N}$, $112_{1,2,\ldots,N-1,N}$, $122_{1,2,\ldots,N-1,N}$, $132_{1,2,\ldots,N-1,N}$ including two ends I, O one of which is an input type end I and the other of which is an output type end O, with, for each of the phases P1, P2, P3:

the first and the second elementary coil $111_1$, $121_1$, $131_1$, $112_1$, $122_1$, $132_1$ of the first pair $110_1$, $120_1$, $130_1$ are intended to be respectively connected to one of the current input and the current output of said phase P1, P2, P3 and to the other of the current input and the current output of said phase P1, P2, P3;

for each of the first to the $N-1^{st}$ pair $110_{1,2,\ldots,N-1}$, $120_{1,2,\ldots,N-1}$, $130_{1,2,\ldots,N-1}$, the first elementary coil $111_{1,2,\ldots,N-1}$, $121_{1,2,\ldots,N-1}$, $131_{1,2,\ldots,N-1}$ has one of the ends I, O thereof connected to the end of the same type of the first elementary coil $111_{1,2,\ldots,N-1}$, $121_{1,2,\ldots,N-1}$, $131_{1,2,\ldots,N-1}$ which directly follows it along the magnetic inductor body 101;

for each of the second to $N^{th}$ pair $110_2,\ldots,N-1,N$, $120_2,\ldots,N-1,N$, $130_2,\ldots,N-1,N$, the second elementary coil $112_2,\ldots,N-1,N$, $122_2,\ldots,N-1,N$, $132_2,\ldots,N-1,N$ has one of the ends I, O thereof connected to the end of the same type of the second elementary coil $112_2,\ldots,N-1,N$, $122_2,\ldots,N-1,N$, $132_2,\ldots,N-1,N$ which directly precedes it along the magnetic inductor body 101; and for the $N^{th}$ pair $110_N$, $120_N$, $130_N$, the first and second elementary coils $111_N$, $121_N$, $131_N$, $112_N$, $122_N$, $132_N$ are connected in series.

Figure 6:
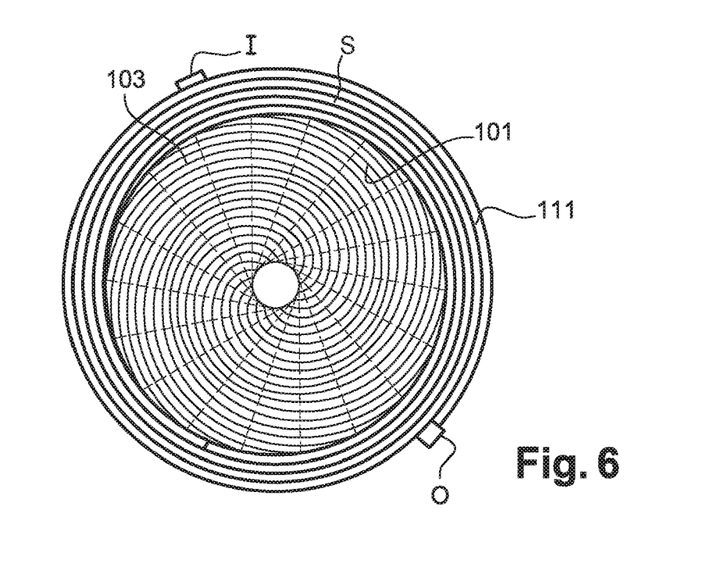
FIG. 6 illustrates a sectional view of an internal magnetic inductor according to a second embodiment of the invention wherein the magnetic inductor includes an inductor body in the shape of an involute of a circle.

FIG. 6 illustrates a sectional view of a magnetic inductor 100 according to a second embodiment of the invention wherein the magnetic inductor body 101 includes magnetic plates 103 called "involute of a circle" magnetic plates. Such a magnetic plate 103 extends along a main axis, the central axis 301 of the magnetic inductor body 101 and has a cross section in the shape of an involute of a circle.

A magnetic inductor body 101 including such magnetic plates 103 "in the shape of an involute of a circle" can be formed by a manufacturing method including the following steps:

providing the plurality of identical magnetic plates 103, each of the magnetic plates 130 extending along a main axis 301 and having a cross section in the shape of an involute of a circle, adding on a plurality of magnetic plates 103 non-stick and dielectric coatings this is in order to facilitate the interlocking and allow, assembling the plurality of magnetic plates 103 by interlocking in order to form an axial tubular body, the circle of the involute of a circle of the magnetic plate 103 being merged together, cutting the transverse grooves 102 in a longitudinal surface of the tubular body of an internal longitudinal surface and an external longitudinal surface in order to form a housing for the elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$, providing the elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$, placing the elementary coils $111_{1,2,\ldots,N-1,N}$, $112_{1,2,\ldots,N-1,N}$, $121_{1,2,\ldots,N-1,N}$, $122_{1,2,\ldots,N-1,N}$, $131_{1,2,\ldots,N-1,N}$, $132_{1,2,\ldots,N-1,N}$ in the transverse grooves 102 formed during the cutting step, and thus forming the magnetic inductor 101.

It can be noted that in a usual implementation of the invention, the steps of providing and placing the elementary coils are concomitant since the provision step consists in assembling the elementary coils directly into the corresponding transverse grooves.

Of course, if in the two embodiments described above the conductors 108, 119 used to connect the elementary coils $111_{,2,\ldots,N-1,N}$, $112_{,2,\ldots,N-1,N}$, $121_{,2,\ldots,N-1,N}$, $122_{,2,\ldots,N-1,N}$, $131_{,2,\ldots,N-1,N}$, $132_{,2,\ldots,N-1,N}$ are distributed along the magnetic inductor body bearing on the external surface other configurations are also possible without departing from the scope of the invention.

Thus, for example, it is perfectly possible that the magnetic inductor body is provided with longitudinal grooves to house the conductors or else that the conductors are housed inside the magnetic inductor body.

What is claimed is:

1. A magnetic inductor for an electromagnetic pump, the magnetic inductor being intended to be power supplied by means of a polyphase current comprising at least two phases, the magnetic inductor comprising:

a magnetic inductor body extending longitudinally, for each of the phases of the polyphase current, N pairs of elementary coils of the same winding direction following each other from the first pair to $N^{th}$ pair along the magnetic body (101), N being an integer greater than or equal to 2, each of the pairs comprising a first and a second elementary coil which follow one another along the magnetic inductor body, each elementary coil including two ends, one of which is an input type end and the other of which is an output type end, wherein the pairs of elementary coils are distributed along the magnetic inductor body so as to provide a phase alternation and to provide a magnetic field sliding along the magnetic inductor body, wherein for each of the phases a connection between the elementary coils associated with said phase is as follows:

the first and the second elementary coil of the first pair are intended to be respectively connected to one of a current input and a current output of said phase and to the other of the current input and the current output of said phase;

for each of the first to the $N-1^{st}$ pair, the first elementary coil has one of the ends (I, O) thereof connected to the end of the same type of the first elementary coil which directly follows it along the magnetic inductor body;

for each of the second to $N^{th}$ pair, the second elementary coil has one of the ends (I, O) thereof connected to the end of the same type of the second elementary coil which directly precedes it along the magnetic inductor body; and for the $N^{th}$ pair, the first and second elementary coils are connected in series.

2. The magnetic inductor according to claim 1, wherein the magnetic inductor body includes a delimiting surface intended to be facing a channel of the electromagnetic pump, and wherein the magnetic inductor body includes on its delimiting surface a plurality of transverse grooves which follow one another along the magnetic inductor body and wherein the elementary coils are housed.

3. The magnetic inductor according to claim 2 wherein each of the elementary coils connected to another elementary coil is connected by means of a respective electrical conductor which extends along the delimiting surface.

4. The magnetic inductor according to claim 3, wherein the magnetic inductor body further includes on its surface longitudinal grooves wherein are housed electrical conductors by which at least part of the coils are connected together.

5. The magnetic inductor according to claim 1 wherein the magnetic inductor body includes a plurality of magnetic plates extending along a main axis and having a cross section in the shape of an involute of a circle, the magnetic plates being interlocked with their circle of the involute of a circle merged together in the shape of a tube extending longitudinally along the main axis, said tube forming the magnetic inductor body.

6. The magnetic inductor according to claim 1, wherein the magnetic inductor is an internal magnetic inductor intended to delimit with a protection tube an internal wall of a channel of the electromagnetic pump (1).

7. The magnetic inductor according to claim 1, wherein the magnetic inductor is an external magnetic inductor intended to delimit with a protection tube an external wall of a channel of the electromagnetic pump.

8. An electromagnetic pump including a first magnetic inductor according to claim 6.

9. The electromagnetic pump including a first magnetic inductor according to claim 7.

10. The electromagnetic pump according to claim 8 further comprising a second magnetic inductor.

11. A method for manufacturing a magnetic inductor for an electromagnetic pump, the magnetic inductor being intended to be power supplied by means of a polyphase current comprising several phases, the method being characterised in that it comprises:

providing a magnetic inductor body, providing and connecting, for each of the phases of the polyphase current, N pairs of elementary coils of the same winding direction following one another of the first pair to the $N^{th}$ pair along the magnetic inductor body (101), N being an integer greater than or equal to 2, each of the pairs comprising a first and a second elementary coil which follow one another along the magnetic inductor body each elementary coil including two ends one of which is an input type end and the other of which is an output type end, with, for each of the phases:

the first and the second elementary coil of the first pair are intended to be respectively connected to one of a current input and a current output of said phase and to the other of the current input and the current output of said phase;

for each of the first to the $N-1^{st}$ pair the first elementary coil has one of the ends (I, O) thereof connected to the end of the same type of the first elementary coil which directly follows it along the magnetic inductor body;

for each of the second to $N^{th}$ pair, the second elementary coil has one of the ends (I, O) thereof connected to the end of the same type of the second elementary coil which directly precedes it along the magnetic inductor body (101); and for the $N^{th}$ pair, the first and second elementary coils are connected in series.

12. The method for manufacturing an inductor according to claim 11, wherein the magnetic inductor body includes a plurality of magnetic plates extending along a main axis and having a cross section in the shape of an involute of a circle, providing the magnetic inductor body includes:

providing the plurality of identical magnetic plates, each of the magnetic plates extending along a main axis and having a cross section in the shape of an involute of a circle, assembling the plurality of magnetic plates by interlocking in order to form the magnetic inductor body, the circle of the involutes of a circle of the magnetic plates being merged together.

13. The method for manufacturing an inductor according to claim 12, wherein the step of providing the magnetic inductor body further includes:

cutting the transverse grooves in a longitudinal surface of the tubular body of an internal longitudinal surface and an external longitudinal surface in order to form a housing for the elementary coils, and wherein the provision and connection provision and connection step includes the following sub-steps:

providing elementary coils, placing the elementary coils in the transverse grooves formed during the cutting step.

\* \* \* \* \*